(12) United States Patent
Löbig

(10) Patent No.: US 7,961,713 B2
(45) Date of Patent: Jun. 14, 2011

(54) EFFICIENT CONNECTION OF ISDN PRIVATE BRANCH EXCHANGES TO A PACKET-SWITCHED NETWORK

(75) Inventor: Norbert Löbig, Darmstadt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1899 days.

(21) Appl. No.: 10/522,824

(22) PCT Filed: Jun. 11, 2003

(86) PCT No.: PCT/DE03/01947
§ 371 (c)(1),
(2), (4) Date: Jan. 31, 2005

(87) PCT Pub. No.: WO2004/017667
PCT Pub. Date: Feb. 26, 2004

(65) Prior Publication Data
US 2005/0232234 A1    Oct. 20, 2005

(30) Foreign Application Priority Data
Jul. 31, 2002  (DE) .................................. 102 34 936

(51) Int. Cl.
*H04L 12/66* (2006.01)
(52) U.S. Cl. .................... 370/352; 370/264; 370/524
(58) Field of Classification Search .......... 370/352–354, 370/264, 524
See application file for complete search history.

(56) References Cited

U.S. PATENT DOCUMENTS

| 5,182,750 | A | * | 1/1993 | Bales et al. | 370/384 |
| 5,943,408 | A | * | 8/1999 | Chen et al. | 379/216.01 |
| 6,026,290 | A | * | 2/2000 | Lamkin et al. | 455/405 |
| 6,275,573 | B1 | * | 8/2001 | Naor et al. | 379/194 |
| 6,359,880 | B1 | * | 3/2002 | Curry et al. | 370/352 |
| 6,396,840 | B1 | * | 5/2002 | Rose et al. | 370/401 |
| 6,434,139 | B1 | * | 8/2002 | Liu et al. | 370/352 |
| 6,888,839 | B1 | * | 5/2005 | Scoggins et al. | 370/410 |
| 7,046,683 | B1 | * | 5/2006 | Zhao | 370/401 |
| 7,173,910 | B2 | * | 2/2007 | Goodman | 370/252 |

FOREIGN PATENT DOCUMENTS

EP    0 948 236 A2    10/1999
EP    1 170 963 A2    1/2002

* cited by examiner

*Primary Examiner* — Simon Sing
(74) *Attorney, Agent, or Firm* — Laurence A. Greenberg; Werner H. Stemer; Ralph E. Locher

(57) ABSTRACT

The invention relates to the representation of ISDN connections, which is independent of the type of connection, in a packet-oriented exchange. By adapting the signaling information, which is transmitted by ISDN connections, in a peripheral adapter, different ISDN connection types can be handled as a standard connection type in the packet-oriented exchange. The adaptation can ensue, for example, with the aid of a conversion table for the useful data references and call identifiers comprising signaling messages. The invention is advantageous in that it involves an uncomplicated representation of ISDN data in the packet-oriented exchange. ISDN connection-related data do not need to be managed in the packet-oriented exchange.

16 Claims, 4 Drawing Sheets

EFFICIENT CONNECTION OF ISDN PRIVATE BRANCH EXCHANGES TO A PACKET-SWITCHED NETWORK

CROSS REFERENCE TO RELATED APPLICATIONS

This application is the US National Stage of International Application No. PCT/DE03/01947, filed Jun. 11, 2003 and claims the benefit thereof. The International Application claims the benefits of German application No. 10234936.3 DE filed Jul. 31, 2002, both of the applications are incorporated by reference herein in their entirety.

FIELD OF INVENTION

The invention relates to a method and a peripheral adapter for exchanging signaling information between an ISDN connection and a packet-oriented exchange.

BACKGROUND OF INVENTION

The convergence or the joining together of time division multiplexing-based networks—also known as TDM networks—and packet-based networks has resulted in new switching requirements for in terms of converting signaling and useful data.

In the course of tuning time division multiplexing-based and packet-based networks, the term interworking is frequently used here, adjustments are required not only at the subscriber end but also at the exchange node end.

A TDM-based exchange or a TDM-based exchange node instigates the data link control and the scheduling or through switching of the bearer channels. The range of tasks of an exchange transmitting data in the packet-switched network—hereinafter called packet related exchange—includes, however, in addition to the usual data link control, the control of the associated bearer channels run outside the packet-based exchange, said control being implemented by means of external devices (e.g. Gateways, Resource Servers, . . . ), which provide suitable interfaces for useful data streams (e.g. using the RTP (Real Time Protocol)) and control (e.g. using one of the following protocols: MGCP (Media Gateway Control Protocol), H.248, H.323).

For the terminal side, in addition to the classic analogue and ISDN terminals and private branches, there are also terminals suitable for the packet-switched network, which terminals allow broadband data access but that in addition are capable of supporting the basic performance features known from public telephone networks (e.g. using the H.323 protocol or the SIP (Session Initiation Protocol) protocol). Extension circuits or cable networks operated using the appropriate xDSL technology (DSL: Digital Subscriber Line) are often used as a broadband access medium or access network to the subscriber.

The interface between access network and transmission network, e.g. packet-based IP (Internet Protocol) network, is usually formed using subscriber end adaptation devices. The term "peripheral adapters" is often used for subscriber end adaptation devices. Examples of subscriber end adaptation devices are IAD (Integrated Access Device) for scheduling an xDSL line and MTA (Multimedia Terminal Adapter) on or in the Cable Modem, which terminates the access network on the transmission network side. Thus using subscriber end adaptation devices and access networks, it is possible to connect broadband terminal devices (e.g. PC with Internet access, tv set, videophone) as well as traditional subscriber terminal units, e.g. analogue telephone, ISDN telephone, and also analogue and ISDN private branch exchange.

Packet-oriented exchanges should, as far as possible, provide all the performance features known in line bound connection technology for traditional terminal units, i.e. telephones and private branch exchanges so that the inclusion of packet-oriented networks does not lead to the range of service characteristics being restricted. In addition, if hardware and software resources are not available or terminal units are not accessible, this must be detected and if necessary the operator alerted to such fact. As a rule, the packet-oriented exchange node does not know the structures of the intermediary access networks. For example, situations where components or network parts fail and which affect the signaling path between the packet-oriented-exchange node and subscriber terminal device, are only indirectly apparent to the exchange node, i.e. through detection of the non accessibility of subscribers and private branches.

Traditional analogue and ISDN subscribers accessible via a packet-switched network are identified in a special way for administration in the packet-based exchange node to differentiate them from purely packet-based subscribers (SIP, H.323) and traditional, analogue and ISDN subscribers connected by telephone line (e.g. connections via the interfaces V5.1 and V5.2). The peripheral, subscriber end adaptation devices possess special functions (e.g. telephony client in IADs and MTAs), which make it possible to transmit the signaling between terminal unit and packet-based exchange via intermediary access networks and packet-based transmission networks or wide area networks. The packet-based exchange systems and clients in the peripheral adaptation devices (IAD, MTA) can, in addition, be correspondingly configured by the network administration. The exchange system differentiates analogue and ISDN interfaces when it provides functions in the subscriber end adaptation devices for transmitting signaling. For the packet-based exchange system a further differentiating feature is the allocation of performance features of a main station or of a private branch connection. From the subscriber's view, then either an analogue or an ISDN terminal unit operated as a main station is connected to the peripheral adapter (IAD, MTA), or similarly an analogue or ISDN private branch exchange (also called PBX) is connected.

With respect to ISDN interfaces, e.g. on the peripheral adaptation device, two different connections or interfaces are differentiated:

In the case of the basic connection, also referred to as BRA (Basic Rate Access), there are one or two bearer channels available. Frequently there are two bearer channels (B-channel) each of 64 kbit/s (56 kbit/s in USA) and a signaling channel (D-channel) of 16 kbit/s.

The second type of connection, also referred to as PRA (Primary Rate Access), is the primary multiplex connection, comprising, as a rule, 30 B-channels (because of the PCM30 system), a synchronization channel and a signaling channel (D-channel). According to standardization, up to 4 PCM30 systems can also be put together with a single D-channel to form a PRA.

As opposed to the case with a packet-based exchange, the status (layer 1, layer 2, blocking status) of the ISDN connection (BRA, PRA) is known to a traditional local exchange of a TDM network because of physical line scheduling or because of the interface protocols for subscriber line concentrators and access networks.

It must also be possible for packet-switched networks to use peripheral adapters to connect small ISDN private branches via a BRA or a number of BRAs; it must be possible to link large ISDN private branches via one or a number of PRAs, whereby it must be possible to support a mixture of BRAs and PRAs with respect to one given ISDN private branch. Hereby, BRA and PRA are possibly connected via one standard adapter or via specific peripheral adapters and physically timed. The ISDN signaling can then be exchanged packet-based between peripheral adapter and packet-oriented exchange (e.g. using ISDN User Adaptation IUA and SCTP). This usually occurs by means of the DSS1 (Digital Signaling System No. 1) protocol, details of which protocol are set out in the Standard ITU-T Q.931 (ISDN user-network interface layer 3 specification for basic call control).

SUMMARY OF INVENTION

The object of the invention is to specify a flexible and efficient method to connect ISDN private branch exchanges with peripheral adapters to a packet-switched network.

In the invention, signaling information is exchanged between an ISDN connection, for example, an ISDN BRA or ISDN PRA connection, and a packet-oriented exchange via a peripheral adapter. An ISDN terminal unit or an ISDN private branch exchange, for example, can be connected to the ISDN connection. The signaling information transmitted by the ISDN connection is handled or processed in the packet-based exchange independent of the type of the ISDN connection. For example, in the packet-based exchange, no differentiation is made between ISDN BRA and ISDN PRA connections. The peripheral adapter is, for example, an IAD or an MTA. So that the packet-oriented exchange handles signaling information independent of the ISDN connection type, signaling information transmitted by the ISDN connection to the peripheral adapter is adapted. Accordingly, signaling information transmitted by the packet-oriented exchange to the peripheral adapter for forwarding to the ISDN connection is adapted according to the ISDN connection type. In this way, different ISDN connections can be represented by one single connection type in the packet-oriented exchange. In general, different ISDN connection types contain a different number of useful data channels. Thus the PRA connection generally has 30 useful data channels and one signaling channel. The BRA connection or basic connection, on the other hand, usually comprises one or two useful data channels and one signaling channel. With the adaptation of signaling information in the peripheral adapter according to the invention, the different useful data channels can be mapped one on top of the other for different connection types on the side of the packet-oriented exchange system and on that of the ISDN connection. Thereby useful data channels or logical ports in the packet-switched network can be differentiated by the addressing of the packets or the addresses of the packets. With transmission of useful data in the TDM network and in the packet-switched network the term "bearer" is often used instead of "useful data channel". According to the invention there is then a correlation between logical port or useful data channel (bearer) and the provision of resources in packet-oriented exchange systems. For example, a switching oriented program can be serviced in the packet-oriented exchange system in accordance with the logical port or the useful data channel. On the ISDN connection side, there are physical ports as well as useful data channels, which are assigned fixed time slots when they are transmitted via a TDM network. The useful data channels of the PRA can be converted in accordance with the invention to bearer channels of logical ports, and the signaling information correspondingly adapted with the aid of a table in the peripheral adapters. Such a table will be created, for example, by the network administration in the peripheral adapter. This would require the network administration to know the hardware interfaces and/or the physical ports of the ISDN connection in order to be able to create the table. Normally the network administration has this information alone for the reason that the peripheral adapter must have been suitably configured by said administration. As opposed to the network administration, the details relating to the ISDN connection for the packet-oriented exchange are transparent. The information on the hardware details of the ISDN connection held by the network administration does not need to be available to the packet-oriented exchange. All physical ISDN connection inherent functions can be handled in the peripheral adapter, whereby the administration of the packet-based exchange can be reduced to one standard logical ISDN port type or ISDN connection type with a fixed number of bearer channels.

The invention enables the cost of implementation in the packet-oriented exchange to be reduced, as only one single ISDN connection type has to be handled. The administration of hardware data in the packet-oriented exchange, which already has to be administered for the peripheral adapter, is avoided, resulting in a reduction of the service costs for the network and the elimination of data inconsistencies between peripheral adapter and packet-based exchange. The reduction in the administration costs goes hand in hand with a lower consumption of resources in the packet-based exchange, which lower consumption is manifested, for example, in the memory occupancy, and as a result information related to ISDN connection does not have to be stored in the packet-based exchange. By means of the adaptation function of the peripheral adapter, a flexible allocation of the logical resources of the packet-based exchange to the physically available resources of the peripheral adapter has been created, which allocation can be adapted by the network administration. In addition, the adaptation according to the invention in the peripheral adapter allows useful data channels to be concentrated. For example, the 30 useful data channels of a private branch exchange with PRA connection can be mapped on less than 15 BRA connections in the packet-oriented exchange. Hereby, it is assumed that the above mentioned logical port type of the packet-based exchange coincides with the ISDN BRA with up to 2 bearer channels. This is an economical solution where the utilization of the useful data channel of the ISDN connection is low. By configuring the peripheral adapter, the concentration of the useful data channels can if required be flexibly adapted to an amended loading of the useful data channels of the ISDN connection. Hereby it is also possible to allow for PRA with more than 30 bearer channels.

Where there are differences between the logical ISDN connections in the packet-oriented exchange and the physical ISDN connections on the subscriber side, the call identifier frequently must also be adapted in the peripheral adapter in addition to mapping the useful data channel references, e.g. channel numbers. Thereby, with call identifier is meant the identification information referred to as call reference in the ITU-T Q.931, ISDN user-network interface layer specification for basic call control. This call identifier differentiates calls. As opposed to the call number of a subscriber, the call identifier can assume different values on disjunctive sections for a connection. Call identifiers are assigned to connections. Once a connection has ended the associated call identifier is free again and can be reassigned. Finally, a call identifier is only unique within one signaling channel. The latter characteristic makes it necessary in many cases for the call identifier to be converted in the peripheral adapter. For example, the exchange side works with logical BRA-ISDN connections, each of which comprise two basic channels and one signaling channel. Several of these logical BRA-ISDN connections are then mapped on a PRA-ISDN connection with thirty useful data channels and one signaling channel. Thus it occurs that several signaling channels are mapped on one signaling channel, that means that without an adaptation of the call identifier the uniqueness of the call identifiers would be called into question.

With the signaling between ISDN connection and peripheral adapter, the D-channel protocol DSS1 (Digital Subscriber Signaling System no. 1), for example, is used. With this protocol, according to the OSI (Open Systems Interconnection) model, bit transmission layer (layer 1), backup layer (layer 2) and switching layer. (layer 3) can be differentiated. The backup layer is described in the Standards ITU-T Q.920 (ISDN user-network interface data link layer—General aspects) and ITU-T Q.921 (SDN user-network interface—Data link layer specification). As optimization known from ISDN private branch exchanges, it is analogously proposed not to make a new connection set-up on the backup layer (data link connection in Q.920), between ISDN connection and peripheral adapter, for each call, but to ensure, permanently or over a longer period of time, the transport of signaling messages on the switching layer by means of the backup layer without new adaptations on the backup layer. Signaling messages of layer 3, which are described in the Standards ITU-T Q.930 (ISDN user-network interface layer 3—General aspects) and ITU-T Q.931 (SDN user-network interface layer 3 specification for basic call control), will then be forwarded after possible adaptation in the peripheral adapter packet-switched network with the aid of the SCTP (stream control transmission protocol) protocol and appropriate DSS1 adaptations (IUA).

BRIEF DESCRIPTION OF THE DRAWINGS

The invention is explained below in greater detail in an exemplary embodiment with reference to the figures, in which.

In the Figures, identical reference characters indicate identical elements.

DETAILED DESCRIPTION OF INVENTION

Figure 1:
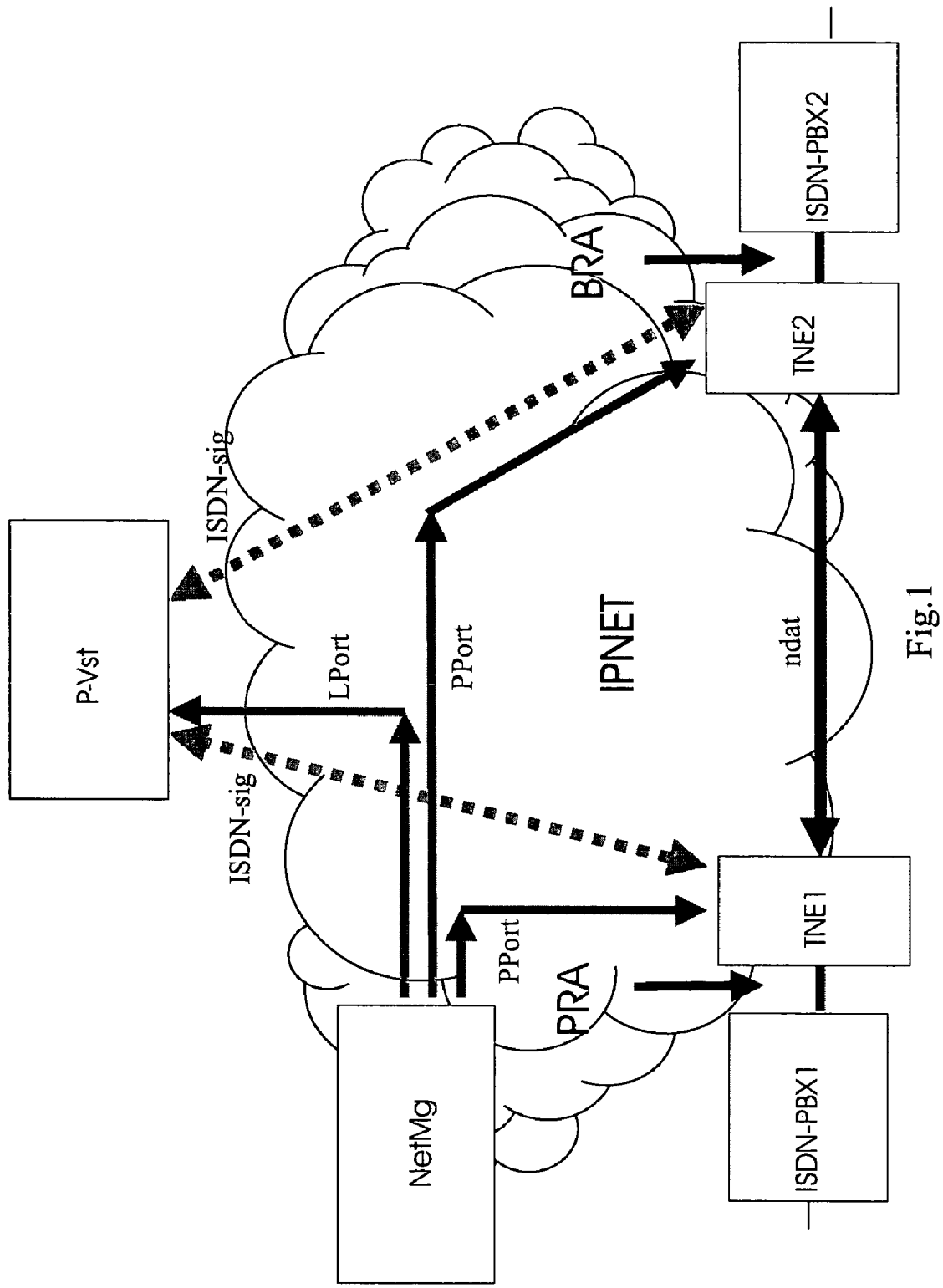
FIG. 1 shows an arrangement of network elements with handling according to the invention of ISDN connections in a packet-based exchange.

In FIG. 1, two ISDN private branches ISDN PBX1 and ISDN PBX2 are connected via two peripheral adapters or subscriber end devices TNE1 and TNE2 to a packet-switched network IPNET. The peripheral adapters TNE1 and TNE2 are, for example, IADs or MTAs. Useful data ndat can be exchanged between the two peripheral adapters TNE1 and TNE2, for example, in the course of a phone call routed via the packet-based network IPNET. In this way, two subscribers connected to the private branches ISDN PBX1 or ISDN PBX2 can communicate with each other. The private branch ISDN PBX1 is connected to the peripheral adapter TNE1 with a PRA connection with thirty useful data channels and one signaling channel. As opposed to that, the second private branch ISDN PBX2 is connected to the peripheral adapter TNE2 with a BRA connection with two useful data channels and one signaling channel. The two different connections are represented in the packet-oriented exchange P-Vst in the same standard way, namely as BRA connections. For the purpose of controlling the transmission of useful data, the packet-oriented exchange P-Vst exchanges signaling information ISDN sig with the peripheral adapters TNE1 and TNE2. The transmission of useful data is controlled, for example, with the aid of the MGCP (Media Gateway Control Protocol) protocol or of the H.248 protocol. In contrast to the packet-oriented exchange P-Vst, the network management NetMg differentiates different ISDN connection types. The network management NetMg administers and/or configures information held at the peripheral adapters TNE1 and TNE2 on the physical connections or ports of the private branches ISDN PBX1 and ISDN PBX2. In addition, the network management NetMg is instrumental in creating or managing the logical representation of the ISDN useful data channels or the logical ports of the ISDN useful data channels in the packet-oriented exchange P-Vst. ISDN signaling messages between the peripheral adapters TNE1 or TNE2 and the packet-oriented exchange P-Vst can be transported with the aid of the SCTP (Stream Control Transmission Protocol) protocol and ISDN specific adaptation layer (e.g. IUA). Using the SCTP protocol, signaling messages can be transmitted efficiently in IP (Internet Protocol) networks SS7. The DSS1 (Digital Signaling System No.1) protocol, for example, is used for signaling between the ISDN private branches ISDN PBX1 and ISDN PBX2 and the respective associated peripheral adapter TNE1 or TNE2. Adaptations are made according to the invention in the peripheral adapter TNE1 for the representation of the PRA connection in FIG. 1 by BRA connections in the packet-based exchange P-Vst.

Figure 2:
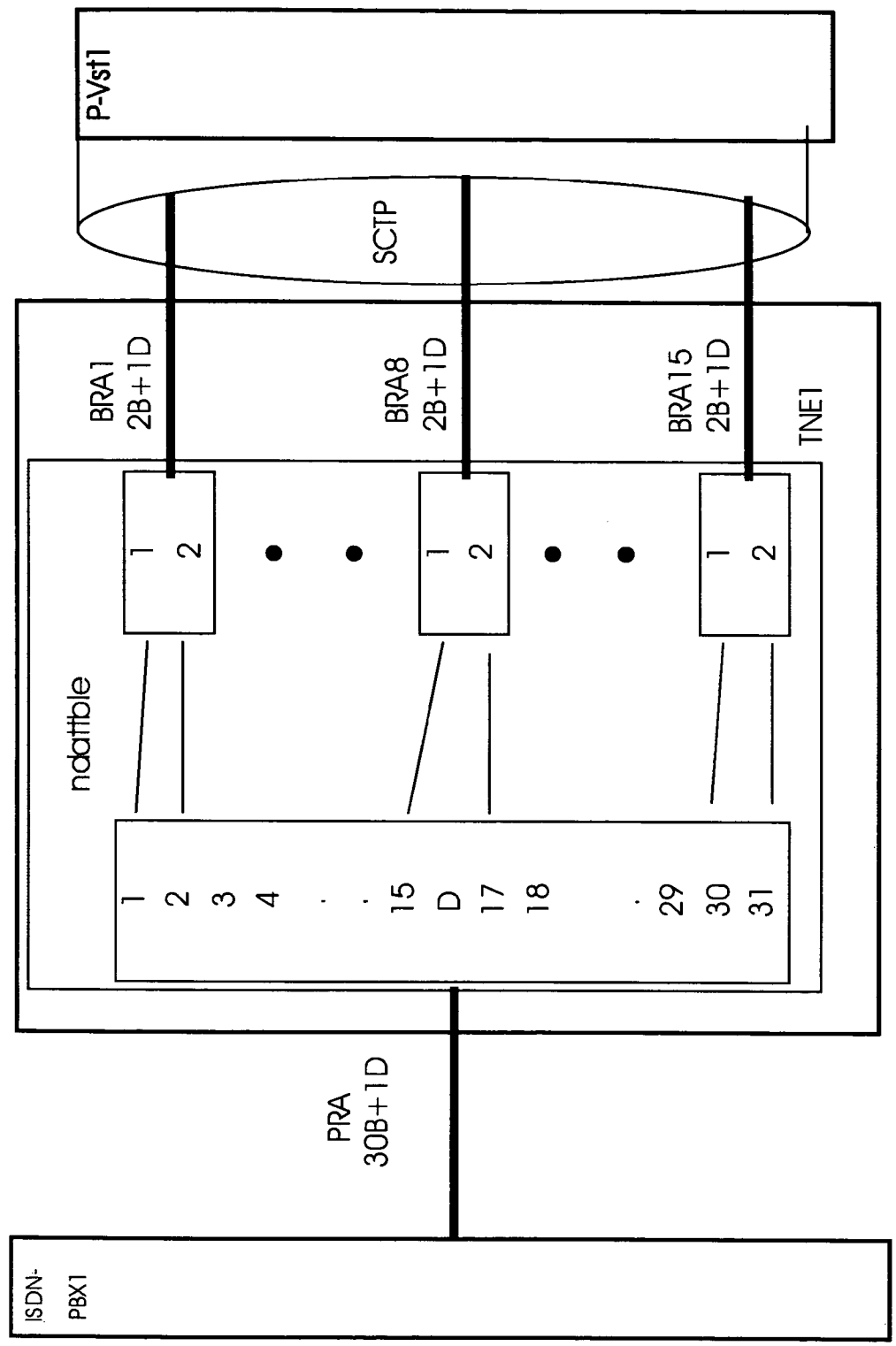
FIG. 2 shows a rearrangement according to the invention of the bearer channels in the course of an ISDN connection independent representation in the packet-oriented exchange.

FIG. 2 shows how the useful data references can be adapted for the purposes of representing a PRA connection by BRA connections in the packet-oriented exchange P-Vst. The BRA connection has thirty basic channels or useful data channels and one signaling channel or D-channel, the latter being shown in FIG. 2 by the reference character 30B+1D. This BRA connection is represented in the packet-oriented exchange PVST by fifteen BRA connections BRA1 . . . BRA15, each connection with two useful data channels and one signaling channel or D-channel (reference character for BRA configuration: 2B+1D). In the peripheral adapter TNE1, with the help of a conversion table ndattble, the fifteen logical BRA connections BRA1 . . . BRA 15 are assigned or mapped on the physical PRA connection. Thereby, the two basic channels of the first BRA connection BRA1 are mapped on the useful data channels 1 and 2 of the PRA connection. The two basic channels of the second BRA connection BRA2 are then mapped on the useful data channels 3 and 4 of the BRA connection. Thus respectively two basic channels of the BRA connections are transported on two useful data channels of the BRA connection. In the numbering according to the conversion table ndattble it must be remembered that the channel with the number 16 of the BRA connection is reserved for signaling and hence does not have to be taken into account when the useful data references are changed. The table illustrated provides a guide for changing useful data references, such as, for example, the useful data channel number, in the signaling messages. The referencing of the useful data channels is adapted. Useful data themselves do not need to undergo any adaptation. The exchange of signaling information, e.g. the transmission of a connection set-up message, between peripheral adapter TNE1 and packet-oriented exchange P-Vst ensues with the aid of the SCTP protocol.

Where there is a concentration of the useful data channels at the exchange end, less than fifteen BRA connections would be mapped on the BRA connection. This can be realized flexibly and simply in so far as the BRA connections are logical connections but not physical ones. A concentration is practical, for example, if the data throughput of the PRA connection is clearly less than the maximum capacity and hence even in load situations only a small part of the useful data channels of the PRA is occupied at the same time.

Figure 3:
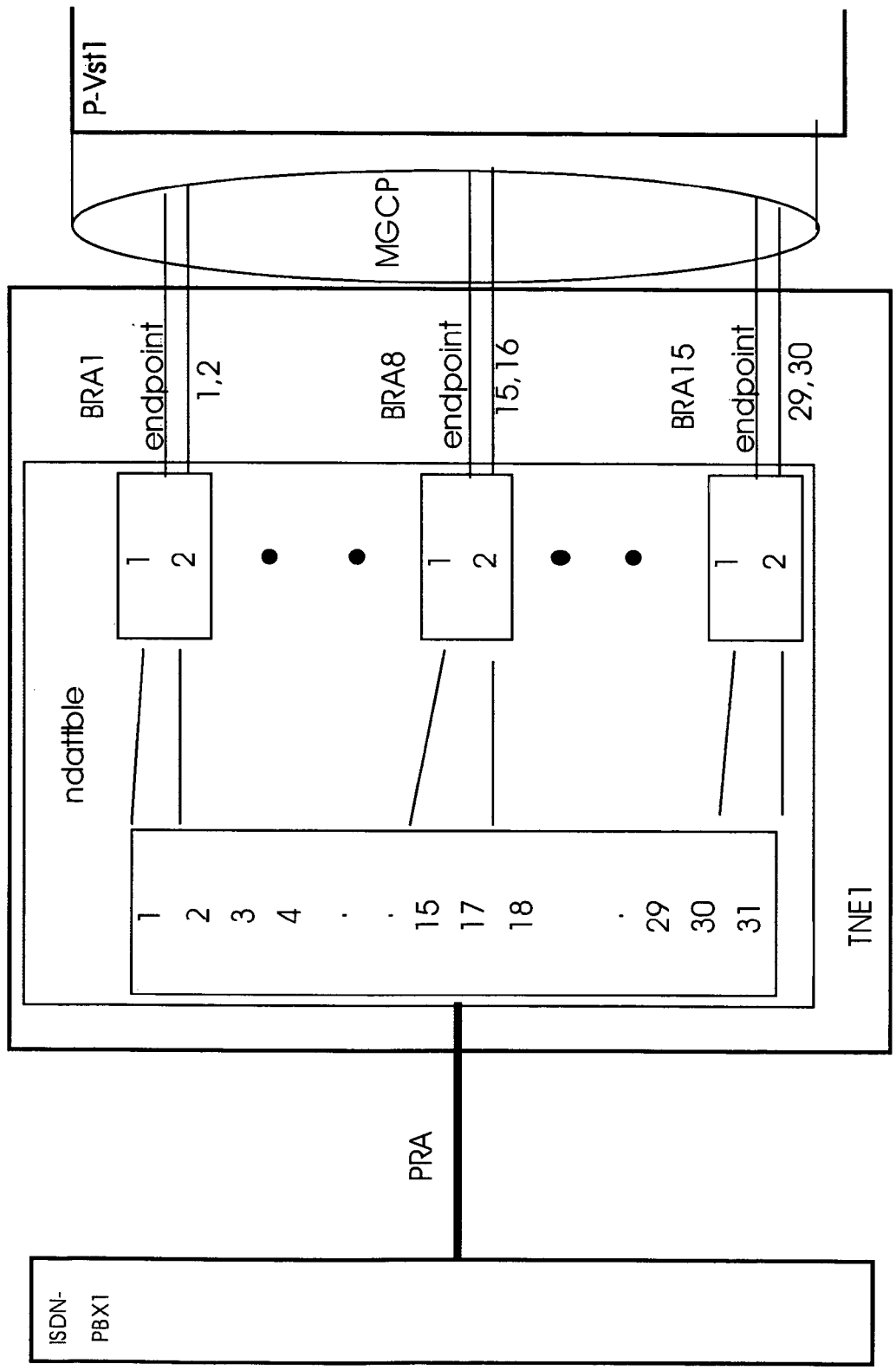
FIG. 3 shows a rearrangement of the bearer channel control corresponding to FIG. 2.

FIG. 3 shows a corresponding conversion of signaling information to the useful data control, e.g. of the useful data routings, in the packet-switched network. The protocol used at the exchange end is thereby, for example, the MGCP protocol, in which each B-channel is defined as its own end point.

Figure 4:
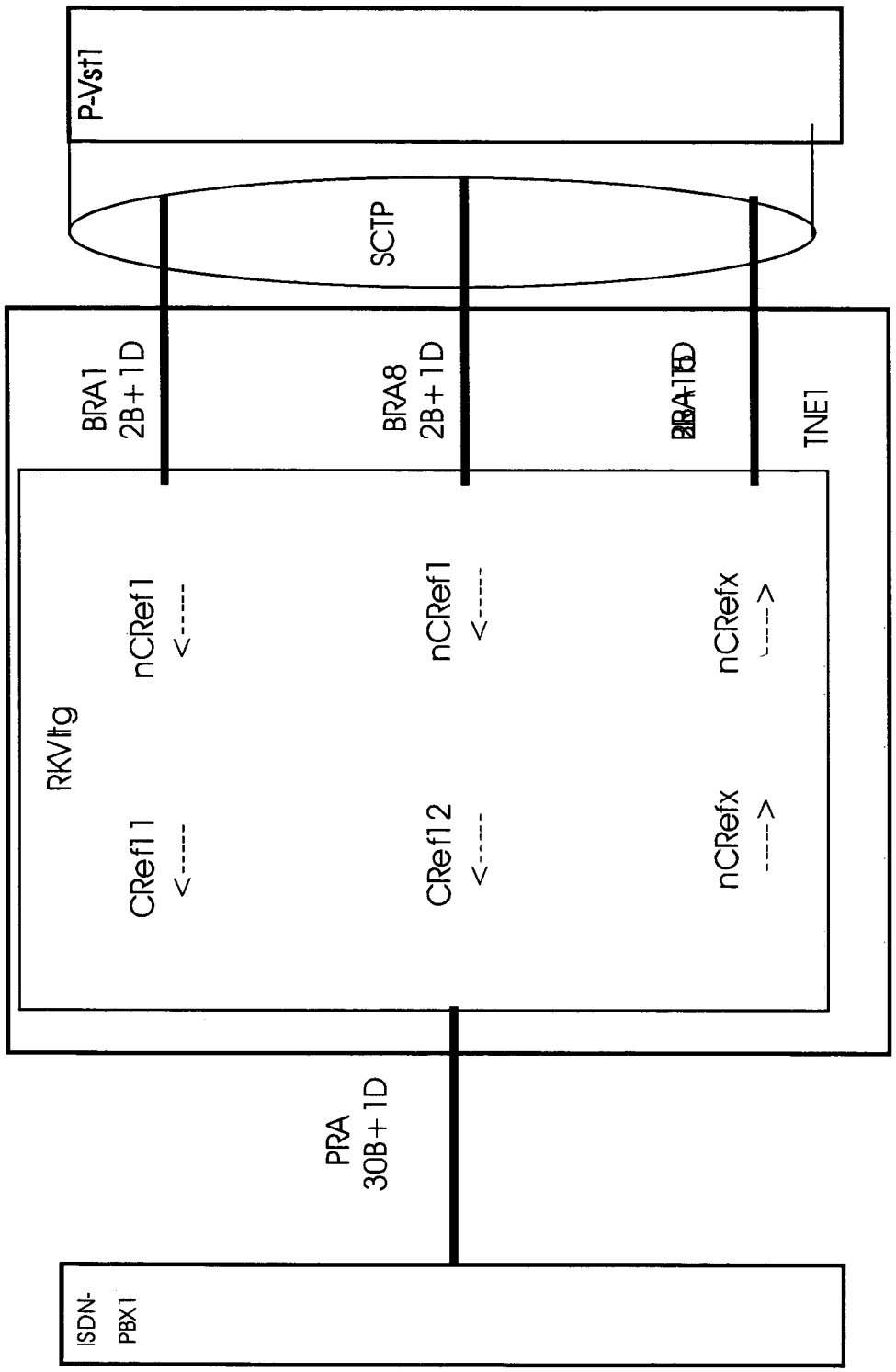
FIG. 4 shows an adaptation, according to the invention, of the call identifiers.

In FIG. 4 there is illustrated the handling, according to the invention, of the call identifiers (call references) for the scenario according to the FIGS. 1 to 3. Call identifiers are assigned temporarily and connection-related per connection or D-channel. As a result, identical call identifiers for different D-channels of the BRA connections can be transferred by the packet-oriented exchange into the peripheral adapter TNE1. Such a situation can occur, for example, if an A-subscriber calls a B-subscriber connected to the private branch ISDN PBX2. Call identifiers from the BRA connections that are transferred to the peripheral adapter TNE1 are adapted by a call identifier management RKV1tg of the peripheral adapter TAE1 for further use at the ISDN private branch end. Identical call identifiers, for example, nCRef1 for the connections BRA1 and BRA2 are thereby mapped on different call identifiers CRefl1 and CRefl2 to provide uniqueness within the D-channel of the PRA connection. Call identifiers newly assigned at the ISDN private branch ISDN PBX1 end, such as, for example, nCRefx, can be taken over unaltered at the exchange side, i.e. packet-switched network side. Call references transmitted via the D-channel of the PRA connection in the direction of the packet-oriented exchange P-Vst are unique within the D-channel and, of course, also maintain this uniqueness after they have been allocated to the D-channels of the different logical BRA connections. The transmission of the call identifiers or of signaling messages that contain call identifiers, between the peripheral adapters TNE1 and the packet-oriented exchange P-Vst is realized preferably with the aid of the SCTP protocol and ISDN specific adaptation layer (e.g. IUA).

The invention claimed is:

1. A method for exchanging signaling information between a PRA ISDN connection and a packet-oriented exchange via a peripheral adapter, comprising:
   processing by the packet-oriented exchange signaling information transferred from the PRA ISDN connection signaling information of a BRA ISDN connection out of a plurality of BRA ISDN connections;
   adapting in the peripheral adapter the signaling information transferred from the PRA ISDN connection in accordance with the ISDN connection type of the BRA ISDN connection; and
   adapting signaling information transferred from the packet-oriented exchange to the peripheral adapter in accordance with the ISDN connection type of the PRA ISDN connection, wherein the PRA ISDN connection is represented by said plurality of BRA ISDN connections in the packet-oriented exchange, and
   wherein call identifiers of said plurality of BRA ISDN connections are adapted in said peripheral adapter with respect to uniqueness within the D-channel of said PRA ISDN connection and wherein call identifiers transmitting via the D-channel of said PRA ISDN connection in the direction of said packet-oriented exchange are allocated to the D-channels of said plurality of BRA ISDN connections without adaption.

2. The method according to claim 1, further comprising: representing different ISDN connections by a single connection type in the packet-oriented exchange wherein the connection type of the PRA ISDN connection differs from the single connection type, by which the different ISDN connections are represented in the packet oriented exchange; exchanging the signaling information between the PRA ISDN connection and the packet-oriented exchange; and adapting the exchanged signaling information in the peripheral adapter in accordance with the different ISDN connection types.

3. The method according to claim 2, wherein adapting the exchanged signaling information ensues according to a mapping of data channels differentiated for the respective different ISDN connection types.

4. The method according to claim 3, wherein the mapping ensues via a table in the peripheral adapter.

5. The method according to claim 3, wherein a concentration of the data channels ensues as part of the mapping.

6. The method according to claim 3, wherein a call identifier and a bearer channel reference are adapted according to the mapping of the data channels.

7. The method according to claim 1, wherein a DSS1 protocol is used between the PRA ISDN connection and the peripheral adapter, and a connection is permanently maintained on a layer of the DSS1 protocol.

8. The method according to claim 3, wherein the exchanged signaling information is converted via the peripheral adapter for controlling a data channel according to the mapping of the data channels.

9. The method according to claim 8, wherein a protocol selected from the group consisting of Media Gateway Control Protocol and H.248 protocol is used between the peripheral adapter and the packet-based exchange for signaling the control of the data channel.

10. The method according to claim 1, wherein in said peripheral adapter via a conversion table up to two data channels of said BRA ISDN connection are mapped to up to two data channels of said PRA ISDN connection, wherein said PRA ISDN connection is a physical PRA ISDN connection and wherein each BRA ISDN connection out of said plurality of BRA ISDN connections is a logical BRA ISDN connection of said packet-oriented exchange.

11. A peripheral adapter for a connection of an ISDN private branch exchange or ISDN terminal to a packet network, comprising a resource for adapting signaling information transferred from a PRA ISDN connection to a packet-oriented exchange for the purpose of the signaling information being processed by the packet-oriented exchange as signaling information of BRA ISDN connections, wherein said peripheral adapter is adapted to adapt call identifiers of a plurality of BRA ISDN connections with respect to uniqueness within the D-channel of said PRA ISDN connection and wherein said peripheral adapter is adapted to allocate call identifiers transmitted via the D-channel of said PRA ISDN connection in the direction of said packet-oriented exchange to the D-channels of said plurality of BRA ISDN connections without adaptation.

12. The peripheral adapter according to claim 11, wherein the adapter is adapted to adapt signaling information that corresponds with different ISDN connection types; and for adapting the signaling information via a mapping of data channels differentiated for the respective ISDN connection types.

13. The peripheral adapter according to claim 12, further comprising a table for adapting signaling information according to the mapping of the data channels.

14. The peripheral adapter according to claim 11, wherein the different ISDN connection types are given by a BRA connection at a packet-switched network end and the PRA ISDN connection at an ISDN connection end.

15. The peripheral adapter according to claim 12, wherein the adapter is further adapted to adapt a call identifier and a bearer channel reference.

16. The peripheral adapter according to claim 11, wherein the adapter is designed as an IAD or an MTA.

* * * * *